US012579368B2

(12) United States Patent
Freitag

(10) Patent No.: US 12,579,368 B2
(45) Date of Patent: Mar. 17, 2026

(54) SYSTEM, DEVICE, AND METHOD TO PROVIDE GENERALIZED KNOWLEDGE ROUTING UTILIZING MACHINE LEARNING TO A USER WITHIN THE SYSTEM

(71) Applicant: SRI International, Menlo Park, CA (US)

(72) Inventor: Dayne Freitag, Descanso, CA (US)

(*) Notice: Subject to any disclaimer, the term of this patent is extended or adjusted under 35 U.S.C. 154(b) by 211 days.

(21) Appl. No.: 18/583,631

(22) Filed: Feb. 21, 2024

(65) Prior Publication Data

US 2024/0281610 A1 Aug. 22, 2024

Related U.S. Application Data

(60) Provisional application No. 63/447,561, filed on Feb. 22, 2023.

(51) Int. Cl.

| | |
|---|---|
| ***G06F 17/00*** | (2019.01) |
| ***G06F 40/30*** | (2020.01) |
| ***G06Q 10/101*** | (2023.01) |
| ***H04L 67/55*** | (2022.01) |

(52) U.S. Cl.
CPC ........... *G06F 40/30* (2020.01); *G06Q 10/101* (2013.01); *H04L 67/55* (2022.05)

(58) Field of Classification Search
None
See application file for complete search history.

(56) References Cited

U.S. PATENT DOCUMENTS

| | | | | |
|---|---|---|---|---|
| 8,135,669 | B2 * | 3/2012 | Olstad | G06F 16/907 707/706 |
| 9,110,873 | B2 | 8/2015 | Woodall et al. | |
| 9,348,815 | B1 * | 5/2016 | Estes | G06F 40/40 |
| 10,163,043 | B2 | 12/2018 | Eigen et al. | |
| 11,397,462 | B2 | 7/2022 | Eledath et al. | |
| 2019/0129749 | A1 * | 5/2019 | White | G06Q 10/109 |
| 2019/0325342 | A1 | 10/2019 | Sikka et al. | |
| 2020/0293975 | A1 * | 9/2020 | Faulkner | G06Q 10/107 |

(Continued)

OTHER PUBLICATIONS

Bansal, A., Sikka, K., Sharma, G., Chellapa, R. and Divakaran, A. Zero-Shot Object Detection, European Conference on Computer Vision, 2018.

(Continued)

*Primary Examiner* — Satwant K Singh

(57) ABSTRACT

The machine learning in the neural networks module can analyze an annotation and its metadata on the annotation made by a first user on a first computing device to make an embedding regarding the annotation and then cooperate with the persistence knowledge store to store the embedding of the machine learning's understanding of the annotation and its metadata. The delivery module can proactively push a notice regarding a potentially related embedding out to a second user on a second computing device based on a threshold amount of relatedness between one or more factors of i) a first task undertaken by the first user and a second task undertaken by the second user, ii) a role of the first user and a role of the second user, and iii) a subject matter of the embedding to a subject matter of a task undertaken by the second user.

20 Claims, 8 Drawing Sheets

(56) References Cited

U.S. PATENT DOCUMENTS

| | | | | |
|---|---|---|---|---|
| 2022/0058489 | A1* | 2/2022 | Volkovs | G06N 3/0499 |
| 2022/0405709 | A1* | 12/2022 | Nouri | G06F 40/169 |

OTHER PUBLICATIONS

Datta, S., Sikka, K., Roy, A., Ahuja, K., Parikh, D. and Divakaran, A. Align2Ground: Weakly Supervised Phrase Grounding Guided by Image-Caption Alignment. Intl. Conference on Computer Vision, 2019.

Devlin, J., Chang, M. W., Lee, K. and Toutanova, K., BERT: Pre-training of deep bidirectional transformers for language understanding, 2018. arXiv.

Elizalde, B., Zarar, S. and Raj, B. Cross Modal Audio Search and Retrieval with Joint Embeddings Based on Text and Audio. Proc. IEEE International Conference on Acoustics, Speech and Signal Processing (ICASSP), 2019.

Fox., M. and Long, D., PDDL2.1: An Extension to PDDL for Expressing Temporal Planning Domains. Journal of Artificial Intelligence Research, vol. 20, pp. 61-124, 2003.

Freed, M., Yarnall, L., Spaulding, A. and Gervasio, M. A Mobile Strategy for Self-Directed Learning in the Workplace. Interservice/Industry Training, Simulation, and Education Conference, 2017.

Gervasio, M. and Myers, K. Learning procedures by augmenting sequential pattern mining with planning knowledge. Advances in Cognitive Systems, 2020.

Li, X., Yin X., Li, C., Zhang, P., Hu, X., Zhang, L., Wang, L., Hu, H., Dong, L., Wei, F., Choi, Y., Gao, J., Oscar: object-semantics aligned pre-training for vision-language tasks, ECCV 2020.

Myers, K., Kolojejchick, J., Angiolillo, C., Cummings, T., Garvey, T., Gervasio, M., Haines, W., Jones, C., Knittel, J., Morley, D., Ommert, W. and Potter, S. Learning by Demonstration Technology for Military Planning and Decision Making: A Deployment Story. Innovative Applications of Artificial Intelligence, 2011.

Myers, K. and Gervasio, M. Solution authoring via demonstration and annotation: An empirical study. Proceedings of the IEEE 16th International Conference on Advanced Learning Technologies (ICALT), 2016.

Peintner, B., Dinger, J., Rodriguez, A. and Myers, K. Task Assistant: Personalized Task Management for Military Environments. Innovative Applications of Artificial Intelligence, 2009.

Qiu, Q., Lezama, J., Bronstein, A. and Sapiro, G. ForestHash: Semantic Hashing with Shallow Random Forests and Tiny Convolutional Networks, European Conference on Computer Vision, 2018.

Quirós, L. and Vidal, E., Evaluation of a Region Proposal Architecture for Multi-task Document Layout Analysis.,2021.

Roundtree, K. A., Goodrich, M. A. and Adams, J. A. Transparency: Transitioning from human-machine systems to human-swarm systems. Journal of Cognitive Engineering and Decision Making, vol. 13(3), (pp. 171-195), 2019.

Sahu, P., Cogswell, M., Rutherford-Quach, S. and Divakaran, A. Comprehension Based Question Answering Using Bloom's Taxonomy, arXiv, 2021.

Sahu, P., Sikka, K. and Divakaran, A. Towards Solving Multimodal Comprehension, arXiv, 2021.

Shwartz, V., West, P., Le Bras, R., Bhagavatula, C., and Choi, Y., Unsupervised commonsense question answering with self-talk, EMNLP 2021.

Smith, R.G., Schoen, E.J., Eckroth, J., Endres, D.M., Florez, S., Elliott, J. and Buchanan, B.G., SPE Research Portal: How SPE Uses Artificial Intelligence to Help You Find Technical Information. The Way Ahead, Society of Petroleum Engineers, Jul. 27, 2021.

Trabasso, T. and Suh, S. Understanding text: Achieving explanatory coherence through online inferences and mental operations in working memory. Discourse processes, vol. 16(1-2), (pp. 3-34), 1993.

St. John, M. F. and Smallman, H. S. Staying up to speed: Four design principles for maintaining and recovering situation awareness. Journal of Cognitive Engineering and Decision Making, vol. 2, (pp. 118-139), 2008.

Xie, H. and Virtanen, T. Zero-Shot Audio Classification Via Semantic Embeddings, in IEEE/ACM Transactions on Audio, Speech, and Language Processing, vol. 29,1242), 2021.

Yang, Z., Garcia, N., Chu, C., Otani, M., Nakashima, Y. and Takemura, H. BERT representations for video question answering. Proceedings of the IEEE/CVF Winter Conference on Applications of Computer Vision (pp. 1556-1565), 2020. https://openaccess.thecvf.com/content_WACV_2020/papers/Yang_BERT.

Yang, F., Matei. B. and Davis, L. S. Re-Ranking by Multi-Feature Fusion with Diffusion for Image Retrieval. IEEE Workshop on Applications of Computer Vision, 2015.

Yorke-Smith, N., Saadati, S., Myers, K. and Morley, D. Like an Intuitive and Courteous Butler: A Proactive Personal Agent for Task Management. Autonomous Agents and Multi Agent Systems, vol. 1, (pp. 337-344), 2009.

Zhong, X., Tang, J. and Yepes, A. J. PubLayNet: largest dataset ever for document layout analysis. In 2019 International Conference on Document Analysis and Recognition (ICDAR) (pp. 1015-1022), 2019. https://arxiv.org/abs/1908.07836.

Zhu, X., Singla, A., Zilles, S. and Rafferty, A. N. An overview of machine teaching, 2018. arXiv preprint arXiv:1801.05927.

Zhang, P., Li, X., Hu, X., Yang, J., Zhang,L., Wang, L., Choi,Y. and Gao, J., VinVL: revisiting visual representations in vision-language models, Proc. of CVPR 2021. https://arxiv.org/abs/2101.00529.

* cited by examiner

Role: drilling planner
Team: Volve operations
Use case: adverse events

Lost circulation events are increasing in the geophysics of the Volve Field.

20

50

Relevance very high!

PKS   40

Role: project manager
Team: data analytics
Use case: geophysical models

Eric.. is developing a new PPFG model.

10

ML's understanding of the notes and their associated portion of a Audio/Textual/video file stored as embeddings in the embeddings space of the Knowledge Store

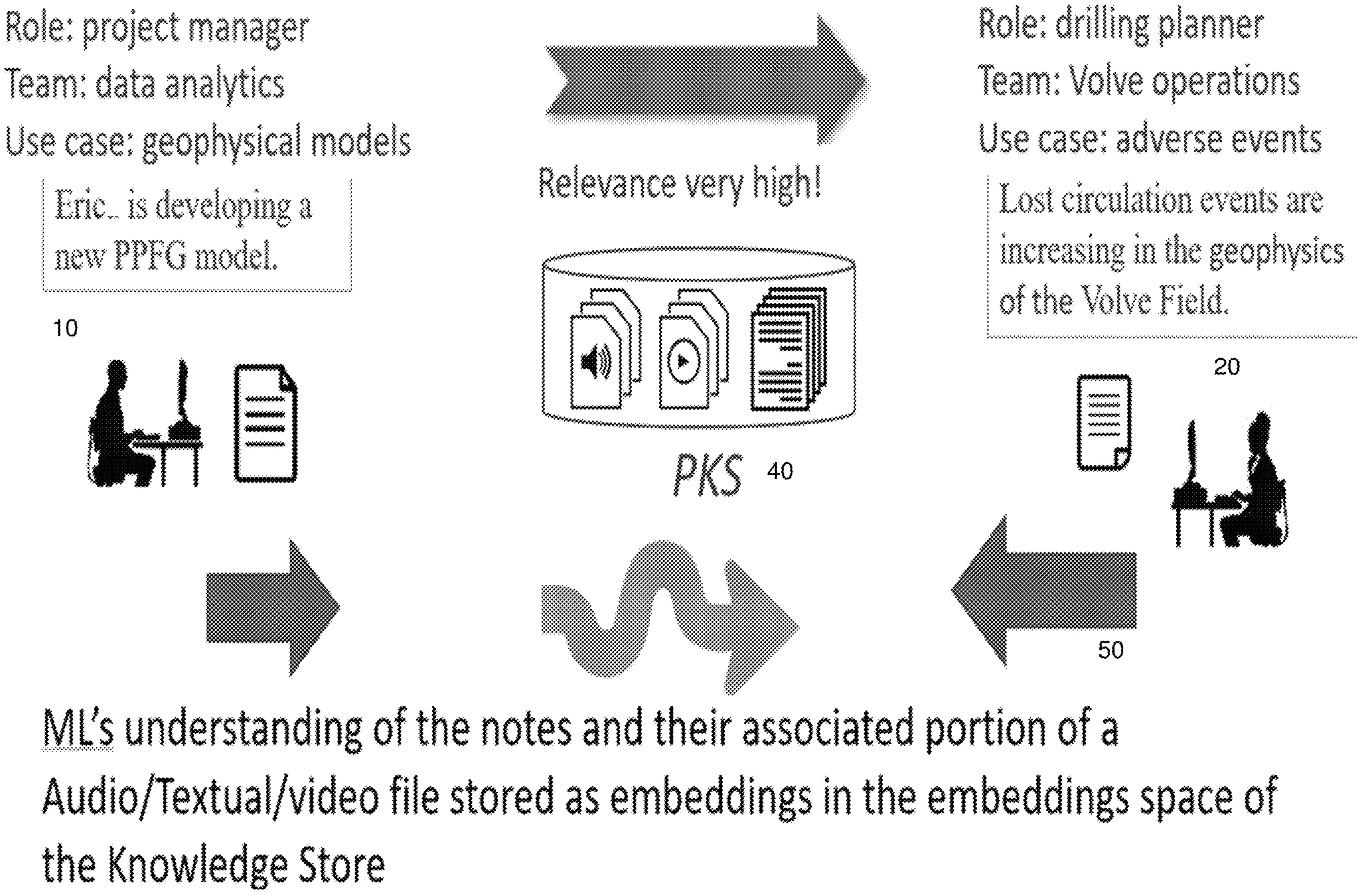

Fig. 3

Zero Shot Synthetic Note Generation

Prompt

Now pretend you are a technical contributor instead, and produce notes from the same week.

Response

30

Task Details and Updates:

1. Assisted Rig Inspection:
- Collaborated with the inspection team during the assessment of Rig #3. Helped identify and address minor issues in the drilling mud circulation system. Rig passed inspection for operational readiness.

...

Challenges and Learnings:

1. Equipment Calibration:
- Learning the intricacies of equipment calibration procedures. Gaining hands-on...

Upcoming Focus Areas: ...

2. Data Analysis - Well A:
- Work closely with the analysis team to delve deeper into pressure data from Well A-17. Collaborate on identifying potential reservoir pressure decline causes and brainstorm mitigation strategies.

...

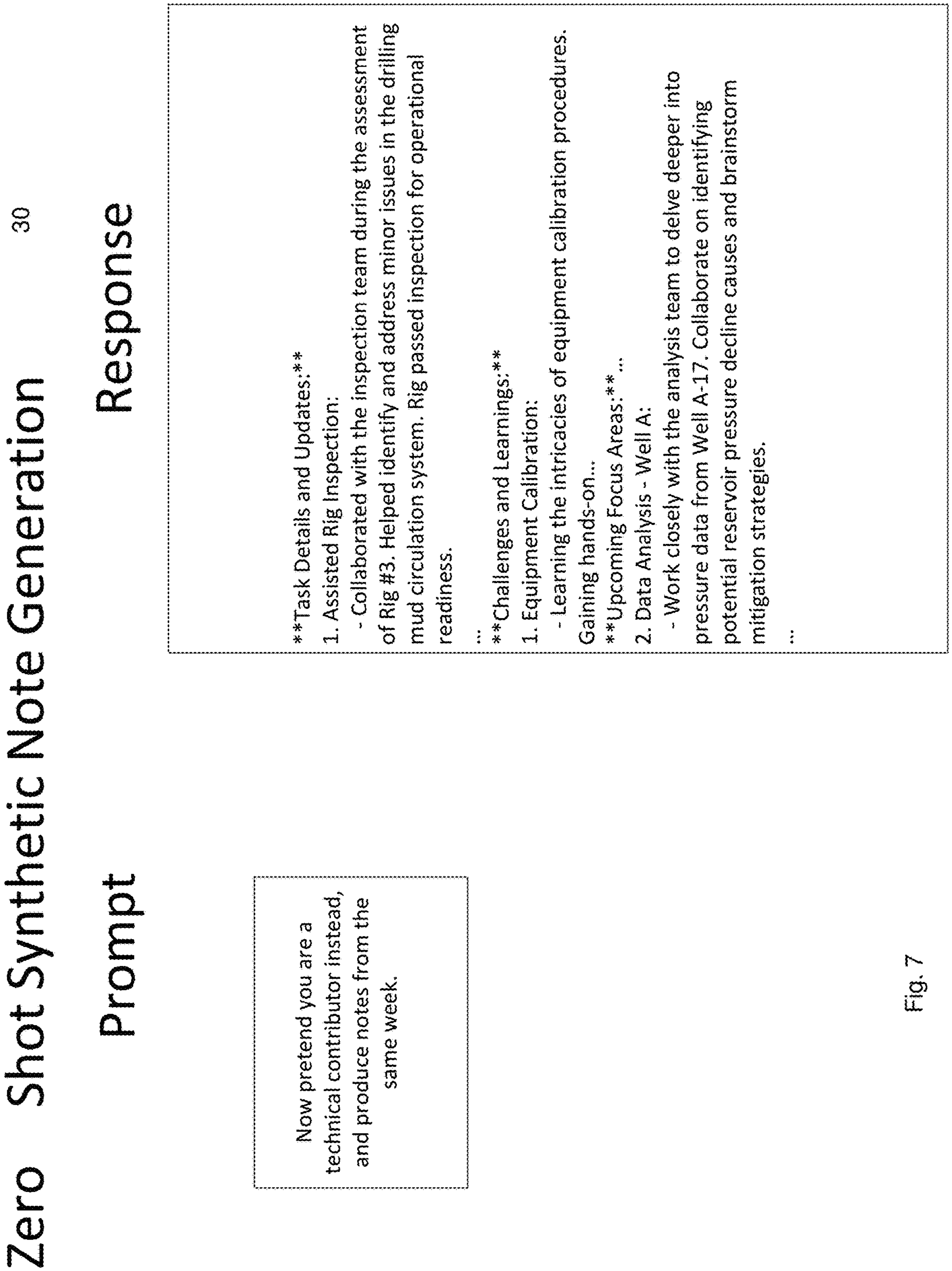

Fig. 7

SYSTEM, DEVICE, AND METHOD TO PROVIDE GENERALIZED KNOWLEDGE ROUTING UTILIZING MACHINE LEARNING TO A USER WITHIN THE SYSTEM

RELATED APPLICATIONS

This application claims priority to and the benefit of under 35 USC 119 of U.S. provisional patent application titled "GENERALIZED KNOWLEDGE ROUTING," filed Feb. 22, 2023, Ser. No. 63/447,561, which is incorporated herein in its entirety by reference.

GOVERNMENT RIGHTS

This invention was made with Government support contract number W911NF-22-C-0048 awarded by the Army Research Office. The Government has certain rights in this invention.

FIELD

Embodiments generally relate to an improved system, method, and device to evaluate, store, and delivery relevant information to a user using machine learning.

BACKGROUND

Microsoft provides an example collaboration software called SharePoint™. The collaboration software allows organizations to store and organize any content and its information. That includes files such as documents, images, videos, news, links, lists of data, web pages, tasks, etc. Manual methods also exist to insert tags, etc. in these files to provide a way that people are going to be able to find this content and its information. However, without a lot of active management by humans and a required need to be very domain-specific in the initial grouping of the information, these systems can quickly over time become not so useful and/or adaptive.

SUMMARY

In an embodiment, a delivery module is configured to cooperate with a neural networks model, and a persistence knowledge store. The machine learning in the neural networks module is configured to analyze an annotation and its metadata on the annotation made by a first user on a first computing device to make an embedding regarding the annotation and then cooperate with the persistence knowledge store to store the embedding of the machine learning's understanding of the annotation and its metadata. The delivery module is further configured to proactively push a notice regarding a potentially related embedding out to a second user on a second computing device based on a threshold amount of relatedness between one or more factors selected from a group consisting of i) a first task undertaken by the first user and a second task undertaken by the second user, ii) a role of the first user and a role of the second user, and iii) a subject matter of the embedding to a subject matter of a task undertaken by the second user.

These and other features of the design provided herein can be better understood with reference to the drawings, description, and claims, all of which form the disclosure of this patent application.

BRIEF DESCRIPTION OF THE DRAWINGS

The drawing refers to example embodiments of the design.

FIG. 3 illustrates a block diagram of an embodiment of the collection module and the neural networks model are configured to cooperate with the persistence knowledge store to create a shared embedding space for this embedding relative to other embeddings.

FIG. 7 illustrates a block diagram of an embodiment of synthetic data used to generate synthetic versions of the annotations, which can be used to train each of the neural networks model utilized by this system.

Figure 1:
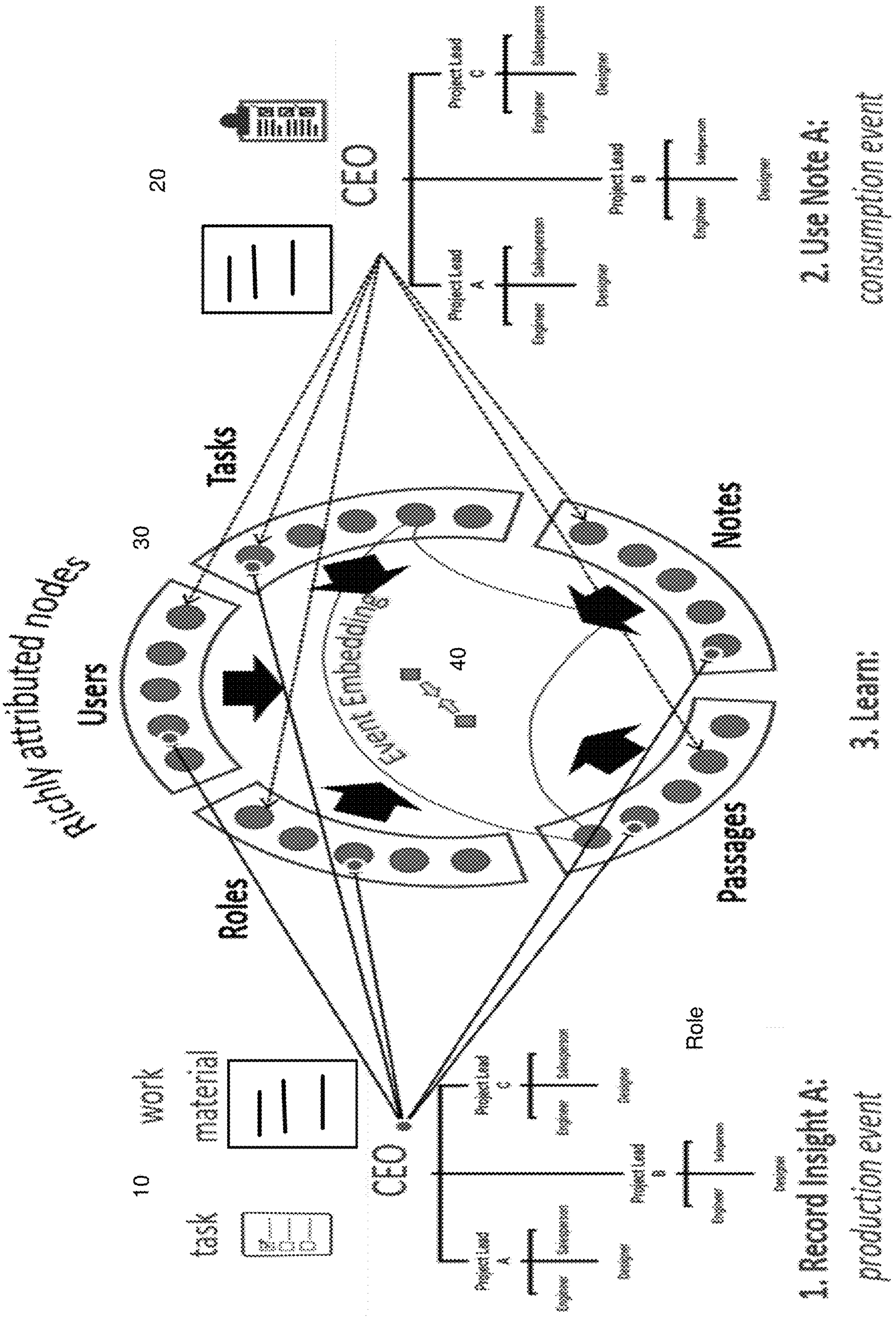
FIG. 1 illustrates a diagram of an embodiment of the collection module cooperating with the neural networks model and the delivery module along with the feedback module to proactively push a notice regarding a potentially related embedding out to a second user on a second computing device and using feedback to refine the machine learning's understanding of an embedding.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific data signals, named components, etc., in order to provide a thorough understanding of the present design. It will be apparent, however, to one of ordinary skill in the art that the present design can be practiced without these specific details. In other instances, well-known components or methods have not been described in detail but rather in a block diagram in order to avoid unnecessarily obscuring the present design. Further, specific numeric references, such as a first user, can be made. However, the specific numeric reference should not be interpreted as a literal sequential order but rather interpreted that the first user is different than a second user. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

FIG. 1 illustrates a diagram of an embodiment of the collection module cooperating with the neural networks model and the delivery module along with the feedback module to proactively push a notice regarding a potentially related embedding out to a second user on a second computing device and using feedback to refine the machine learning's understanding of an embedding. The collection module 20 monitors the first user perceiving i) what tasks/activities the first user is engaged with, ii) the subject matter of the file/work material that the user is making a record/an annotation of, as well as iii) additional metadata such as what is the user's role in the company's hierarchy. The collection module 20 can send that annotation with its metadata and the portion of the file that the annotation was made on to the neural networks model 30. The neural networks module looks at the richly attributed nodes and factors metadata such as a user role, a task being performed, portions of the file (e.g., passage), and the corresponding notes that were made about that portion of the file. The trained machine learning in the neural networks module can analyze an annotation, the portion of the file that corresponds to the annotation about that file, and its metadata on the annotation made by a first user on a first computing device to make an embedding regarding the annotation and then cooperate with the persistence knowledge store 40 to store the embedding of the machine learning's understanding of the portion of the file and the produced annotation about that file and its metadata. In an embodiment, the delivery module 10 can cooperate with at least one of the persistence knowledge store 40 and the neural networks model 30 to monitor the activities of the second user in order to proactively push the notice regarding the potentially related embedding. The delivery module 10 proactively pushes a notice regarding a potentially related embedding out to a second user on a second computing device based on a threshold amount of relatedness between one or more factors selected from a group consisting of i) a first task undertaken by the first user and a second task undertaken by the second user, ii) a role of the first user and a role of the second user, and iii) a subject matter of the embedding to a subject matter of a task undertaken by the second user. In an embodiment, the delivery module 10 is further configured to proactively push the notice regarding the potentially related embedding out to the second user on the second computing device based on the threshold amount of relatedness between all three factors selected from the group consisting of i) the first task undertaken by the first user and the second task undertaken by the second user, ii) the role of the first user and the role of the second user, and iii) the subject matter of the embedding to the subject matter of task undertaken by the second user. In an embodiment, the collection module 20 can cooperate with at least one of the persistence knowledge store 40 and the neural networks model 30 to monitor the activities of the second user in order to cooperate with the delivery module 10 to proactively push the notice regarding the potentially related embedding. The delivery module 10 can provide a rich set of constructs (e.g., a notice) aimed at knowledge sharing (e.g., hints, warnings, error conditions, exceptions). (See for example FIG. 5) The evaluation module 60 can track whether the second user finds the proactively delivered notice on the portions of the file and annotation useful by determining whether the second user consumed the proactively delivered notice. For example, the evaluation module 60 will track whether the other/second user finds the proactively delivered notice on the portions of the file and its annotation is useful to this second user by determining whether the second user consumed that notice, such as actually clicked on the notice sent. The evaluation module 60 can cooperate with a feedback module 50 such that the consumption event of the proactively delivered notice is then supplied by the feedback module 50 to at least one of i) the persistence knowledge store 40 to adjust a distance, such as a linear distance, between stored embeddings in a common shared embedding space relative to other embeddings based upon whether the proactively delivered notice was consumed by the second user or not, and ii) to the neural networks model 30 to refine the machine learning's understanding of the embedding with additional information about the embedding based upon whether the proactively delivered notice was consumed by the second user or not and then store the refined machine learning's understanding of the embedding in the common shared embedding space relative to other embeddings in the persistence knowledge store 40.

The generalized knowledge routing using machine learning uses a number of modules cooperating with each other. The generalized knowledge routing, using machine learning can use, for example, a delivery module 10, a collection module 20, a neural networks model 30, a persistence knowledge store 40, a feedback module 50, and an evaluation module 60.

This system pertains to organizational knowledge management, and in particular, the delivery module 10 proactively routes critical information and/or know-how to task performers in a collaborative setting. The current system and method are intended to improve the state of practice in organization knowledge management. The current system and method target large, complex organizations, with many functions and a diversity of practical concerns. The idea is to present important information that is not documented anywhere and get it in a timely fashion to the people who need it.

Some of the information in this system is typically documented in official operating procedures, but such documentation often excludes important operational details. This deficit is often addressed with things like Slack channels and wikis. The collection module 20 captures such critical information and/or know-how to task performers through a simple note entry/annotation facility, which is converted by a neural networks model 30 to a piece of simplified semantic information and stored, along with any known information about the note taker and their task context in a shared knowledge persistence store/database. Thus, the collection module 20 will discover an organization's operational procedures from a corpus of documents/audio files/video files (files under analysis), converting them to a representation of that file that will subsequently be expanded with annotations captured with additional metadata. The representation of that file expanded with the annotation and captured additional metadata is fed to the neural networks model 30 implemented with, for example, a deep neural network, which is then going to create an embedding understanding of the content of that annotation along with other multimodal data in the embedding such as user role in the organization and the task/activity the user was engaged in when that note entry was created. A neural networks model 30 is then trained on the sum total of this captured information, and then refined using information from successful routing events as a supervisory signal to optimize the matching of captured annotations to potential consumers/task performers in the collaborative setting.

The delivery module 10 disseminates generalized knowledge routing by comparing the embeddings on notations on files produced by machine learning, such as i) the machine learning analyzes the annotation, and then uses user feedback to put those embeddings into a space in the knowledge persistence store and ii) basing the distancing between stored embeddings factoring in success or negative feedback on other users. The delivery module 10 successfully delivers informally captured knowledge within a large organization of collaborating individuals/users, executing different roles, facilitated by machine learning as an embedding learning problem. The delivery module 10 attempts to match the embeddings with mixed factors to disseminate that to other end users and then the feedback module 50 uses positive or negative reinforcement to those embeddings and cooperates with the knowledge persistence store to adjust the space, such as a linear space, between the understandings of those embeddings based off of multiple different users. The knowledge persistence store either pushes the understanding of the embeddings together or pushes them apart. The system learns/gains insight factoring in successful (or lack of success) knowledge routing the consumption of event by a fellow coworker.

In knowledge management, the delivery module 10 cooperating with the knowledge persistence store reduces the time it takes to find a relevant file (e.g., document, audio, or video) and/or insights to perform a task with the desired information and review that material when the delivery module 10 proactively suggests that to other users. The delivery module 10 cooperating with the knowledge persistence store and the neural network model delivers the desired information in a fashion matched to the needs and expertise of the user—in terms of factors, context, and level of detail-without disrupting their workflow. The system provides generalized knowledge routing to establish connections between captured nuggets of information in the annotation and the corresponding portion of the file under analysis and the subsequent consumption of those parts of the performance environment.

In an embodiment, the machine learning applies multitasking contrastive learning to provide the mapping of that technique to this problem space and a formalization of stored knowledge. The neural networks model 30 provides the reduction of note/nugget/annotation activity and its associated particular portion of the file under analysis to a formal representation that can be embedded to which techniques for i) multimodal embedding and ii) contrast of learning can be applied.

The machine learning in the neural network model applied to the corpus of annotations with their portions of the file corresponding to the annotations under analysis allows all of these embedding understandings produced by the machine learning to be put into the shared embedding space. Since all these embeddings are being put into the same shared embedding space because the machine learning in the neural network is parsing and applying a semantic analysis upon the annotation and the portion of the file under analysis and the other metadata associated with the annotation, then the information does not need to have a standard lexicography. The users putting information into the annotations and their corresponding files under analysis can have a different lexicography. All of the subject matters do need to have the same names or lexicography. All of the roles can have slightly different names because the resulting embedding is a machine learning's understanding via semantic analysis of this information and the same machine learning is evaluating and analyzing all of these annotations and portions of the files and then creating the corpus of embeddings in that shared space. This then eliminates a need for some human to come along and insert tags in order to make sure some shared common lexicography is adhered to when comparing these annotations and their portion of the file under analysis.

The collection module 20 can use a note-taking application integrated into a computer user's environment, one with access in principle the user's current and recent activities, including the computer files with which they are working. In the course of performing tasks, the user can record a "note to self"/an annotation in simple English for later retrieval, optionally associating it with particular files. The collection module 20 cooperating with the neural networks model 30 converts this annotation to self-associated with a portion of a document/file to an embedding (e.g., computable semantic representation), adds it to an indexed database of the persistent knowledge store to make later retrieval easy, and annotates the record with any contextual information visible to it, such as the user's identity, role, task, completion status, etc.

These records are then used as training data for neural networks model 30, where the objective is to predict possible consumers of the recorded information. A model trained in this fashion cooperating with the delivery module 10 is subsequently able to proactively present important information to other users in the collaborative environment.

In one embodiment, the system and method may take annotations converted to an embedding as a semantic form for later retrieval from a collaborative environment, capture the broader context, including consumption events by other users, and then use this information for supervised training of something like a graph neural network.

The collection module 20 cooperating with the neural networks model 30 records and makes a machine learning embedding every time a first user (e.g., the producer) inserts an annotation on a file. When the collection module 20 feeds the annotations/nuggets as training data to the graph neural network of the neural networks model 30, they are unlabeled in the supervised learning sense. Also, the task pragmatic factors are not so much used as labels but rather as additional conditioning of the data.

Then the collection module 20 feeds that nugget/annotation representation associated with a particular portion of a file under analysis (e.g., Note taking activity performed/inserted on one or more portions of a file (video/audio/text) under analysis along with its metadata including role, task, subject matter, etc.), as training data into a neural networks model 30 and trains the neural networks to produce the machine learning's understanding of that nugget/annotation representation as an outputted embedding. The neural networks model 30 creates an embedding understanding of that nugget/annotation representation.

The neural networks model 30 learns via learning through contrast learning. These factors are things like roles in an organization, tasks being performed in a particular domain, subject matter/content of the knowledge, etc.

Semantic indexing. The approach aligns corpus content via embeddings. In an embodiment, an ensemble of deep neural networks (DNNs) are trained, one for each factors, to project inputs from different factors onto a common vector space/shared embedding storage space. To reduce the amount of cross-modal annotation for training, these DNNs will be pre-trained using data from individual factors. For instance, to pre-train DNNs for audio, the DNNs can be trained with leverage pre-trained semantic embeddings (e.g., BERT). To combine the information in embedding storage spaces, the system can project the acoustic embeddings onto semantic embeddings via a learned acoustic-semantic projection. Once pre-trained for each factor, DNNs will be refined jointly using annotated data. To minimize fine-grained annotation, the system will use weak supervision at the document/paragraph (instead of word/phrase) or audio/video clip level (instead of objects in key frames). The resultant embeddings will seamlessly ground related entities across textual, visual, and auditory media, enabling efficient indexing and dissemination.

As discussed, the delivery module 10 and the neural networks model 30 can cooperate with the persistence knowledge store 40 to create a shared embedding space for the embedding relative to other embeddings. As such, the persistence knowledge store 40 has a search function for all of the embeddings stored in that persistence knowledge store 40, where a corpus of all of the embeddings that were analyzed by the neural networks model 30 can be searched and retrieved.

The machine learning in the neural networks model 30 can be a graph neural network, a deep neural network, etc., which are then stored into the embeddings space in the persistence knowledge store 40, such as a database, which can adjust linear distance between embedding understandings.

Thus, the machine learning's understanding of the nugget/annotation representation including their annotations itself, the metadata, and the associated portion of an audio/textual/video file is stored as an embedding in the shared embeddings space of the persistence knowledge store 40, and then the entire corpus of the embedding understandings of the different nugget/annotation representations analyzed by the machine learning is stored in that shared embedding space.

The collection module 20 can identify what kind of person the producer of the annotations corresponding to the annotation/nugget representations is, and the delivery module 10 can identify what kind of person the consumer of the annotations corresponding to the annotation/nugget representations is. The collections module and delivery module 10 cooperating with the persistent knowledge store and the neural networks module try to figure out if this piece of knowledge/annotation captured by this person (a first user) could be of interest to this other person (a second user), in this other person's role and/or task in which they are engaged. The collection module 20 and the delivery module 10 are configured to collect, as metadata, the user's role, the tasks/activity that they may have been performing when they created the annotation, and the subject matter of the portion of the file with the annotation/annotation.

The collections module and delivery module 10 cooperating with the persistent knowledge store and the neural networks module can provide knowledge capture and dissemination for task-oriented sharing of expertise and insights across organizations. The collection module 20 and delivery module 10 cooperating with the neural networks model 30 and the persistence knowledge store 40 can provide information retrieval, content analytics, automated understanding and facilitation of human processes, the system will unlock the semantics in source material through multimodal embeddings, provide end users a set of lightweight, complementary options for in-the-flow knowledge capture, and achieve task-sensitive dissemination by modeling the optimum piece of information for a given user and task.

The system can connect captured knowledge with appropriate documents, roles, task contexts, and people, via the mechanism called generalized knowledge routing. The generalized knowledge routing will train predictive neural networks models 30 on the knowledge associations encountered in actual usage. Generalized knowledge routing views a capture event as an action that can be generalized and predicted, exploiting context—the documents at hand, the user involved, and their place in the performance of a task—as a source of metadata features for training models capable of identifying the broader class of contexts to which a given piece of knowledge pertains. The system provides scalable knowledge capture and sharing technologies for disseminating information to users when they critically need it.

Feedback

In addition, the insight/feedback mechanism of whether a knowledge routing is successful/the consumption event occurred (or not) by a fellow task performer (e.g., user/coworker) can be a positive example (or a negative example) utilized in better understanding a particular embedding. The feedback module 50 utilizes that user behavior as a rich source of potential feedback nuggets ("actions speak louder than words"). Thus, the feedback module 50 can cooperate with the neural networks model 30 to predicate the updating/refining of the training of an embedding on that consumption event/successful knowledge routing event. Similarly, user interactions with the system to obtain, consume, and provide feedback on delivered knowledge provide another potential source of insight into the utility and validity of captured knowledge. For example, direct feedback about a recommendation (e.g., a thumbs-up or star rating) as well as implied feedback (e.g., a verbalized "Skip" or "That's great") can be used to influence subsequent knowledge routing. By modeling the expertise of producers and consumers with the neural networks model 30, the system can assist in determining the appropriateness of the annotations for different audiences.

Also, this system does learn from successful consumption events as well as negative consumption events when presenting the knowledge to the people/users who need that information when working on something related to the already stored information. The evaluator module may measure whether another user/task performer i) does or ii) does not potentially find that pushed out annotation corresponding to the annotation/nugget representation interesting/useful when the delivery module 10 proactively presents the annotation/nugget to the other user/task performer. Consumption events can be when the user receives the pushed out annotation and then positively interacted with that pushed out annotation or negatively interacted with that annotation.

A feedback module 50 provides feedback back to the embedding storage space in the persistence knowledge store 40. Here the persistence knowledge store 40 either distance wise pushes the embeddings of the first user and the other users together linearly upon a successful measure that the user's annotation/nugget was helpful to the other user or pushes them apart linearly when there is no indication that the user's annotation/nugget was helpful to the other user. Thus, the persistence knowledge store 40 gets positive or negative reinforcement to those embeddings, and adjusts the linear space between the understandings of those embeddings based on other human users'/task performers' behavior towards using or not using the proactively provided annotation/nuggets initially deemed potentially relevant by the evaluator module to the task being carried out by that other user. Note, the consumption event of when the annotation is used by another user corresponds to a machine learning label when fed back to update/refine the training as well as adjust the embedding space distance between different stored embeddings. Note, that most users can have a history of switching hats so they may not always be associated with a specific role that corresponds to their specific title in the hierarchy. Thus, semantic analysis by the machine learning helps to correct for this variable.

The loss function relevancy is based upon the successful consumption of captured knowledge as the indicator that the feedback module 50 uses, and then the system exploits that to train the embedding, refine the understanding of that embedding, and cooperate with the storing of the embedding in the persistence knowledge store 40 to make the understanding of the embedding even more accurate. The feedback module 50 cooperating with the persistence knowledge store 40 uses the accumulated consumption events to drive together these embeddings.

Thus, we use contrastive multimodal learning to push the embeddings together, when positive, or try to push them further apart when it was not a positive confirmation.

Figure 2:
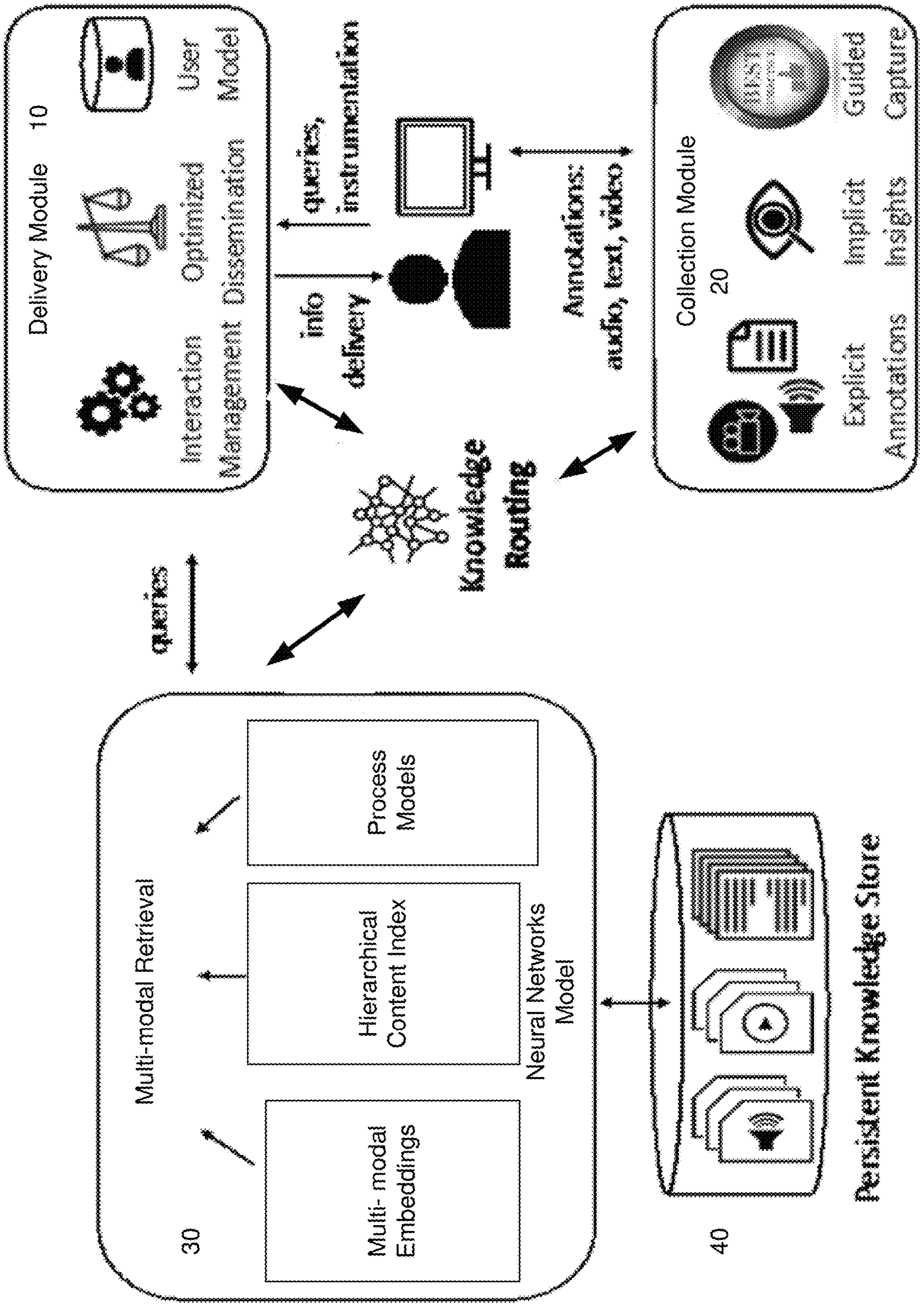
FIG. 2 illustrates a block diagram of an embodiment of the persistence knowledge store cooperating with the neural networks models, the delivery module, and the collections module to make a semantic analysis and parsing of the content in the portion of the file and its corresponding annotation along with its captured metadata.

FIG. 2 illustrates a block diagram of an embodiment of the persistence knowledge store 40 cooperating with the neural networks models 30, the delivery module 10, and the collections module to make a semantic analysis and parsing of the content in the portion of the file and its corresponding annotation along with its captured metadata. The delivery module 10 can make queries back and forth with at least one of the neural networks module and the persistence knowledge store 40 in order to retrieve information regarding the embedding on the annotation its metadata and a portion of a file corresponding to the annotation, when making a determination to proactively push the notice regarding the potentially related embedding out to the second user on the second computing device. The delivery module 10 can also evaluate a user model to gain an understanding of all the users of this system and their hierarchy/roles within inside the organization. The persistence knowledge store 40 stores an embedding on the annotation its metadata and the portion of the file corresponding to the annotation. The files can be audio files, video files, documents, messages, etc. The collections module has a guided capture annotation template that it will send out to a user to capture the annotations. (See FIG. 6)

The collections module can use one or more sensors to capture and understand content in the annotation and portions of a file corresponding to the annotation. Thus, the collections module can use various sensors to capture the explicit annotations and understand the portions of the file corresponding to the annotations such as OCR, image recognition, etc. Then, after a semantic analysis and parsing of the content in the portion of the file and its corresponding annotation, then the collections module can supply the portion of the file and its corresponding annotation for the analysis with the machine learning in the neural networks model 30 to create the embedding.

Previous technologies for augmenting documented knowledge in a file (document file, video file, audio file) and influencing how it is disseminated were mainly limited to tags, wikis, and word of mouth.

The system will greatly expand the set of options, making it easy for users to enter with text and/or speech annotations as an integral part of their work. Explicit annotations made by users can be mapped by a lightweight semantic neural networks model 30, to support knowledge sharing among intel analysts.

Next, by analyzing user interactions with the system, the system will automatically acquire implicit insights derived from behavioral cues with no user overhead. Knowledge capture from users can draw on templates for important types of sharable knowledge (e.g., warnings) that are designed to encourage documentation of key elements of knowledge to be shared (e.g., potential impact). To connect captured knowledge with appropriate documents, roles, task contexts, and people, the system uses generalized knowledge routing that will train predictive neural network models on the knowledge associations encountered in actual usage. Generalized knowledge routing views a capture event as an action that can be generalized and predicted, exploiting context—the documents at hand, the user involved, and their place in the performance of a task—as a source of features for training models capable of identifying the broader class of contexts to which a given piece of knowledge pertains.

In an embodiment, the user model is initialized automatically from the learned task models and associated concepts, then updated based on user interactions and changes in the persistent knowledge store.

FIG. 3 illustrates a block diagram of an embodiment of the collection module 20 and the neural networks model 30 are configured to cooperate with the persistence knowledge store 40 to create a shared embedding space for this embedding relative to other embeddings. In an example, a first user named Eric and her role is an engineer. The first user is performing the activity/task of developing the geophysics involved a new PPFG model and is making annotations about that PPFG model. The collection module 20 collects this information about the portion of the file (PPFG model being created) and the annotation corresponding to that portion of the file as well as metadata. The collections module feeds that to the machine learning in the neural networks model 30, which then creates an embedding understanding of that portion of the file (geophysics aspects of PPFG model being created) and the annotation corresponding to that portion of the file as well as the metadata, which an embedding of that representation is stored in the persistence knowledge store 40. The embedding is the machine learning's understanding of the audio, textual, and/or video in this case on the PPFG model and its corresponding annotation. The particular embedding is stored along with other embeddings from the neural networks model 30 in the embedding space of the persistence knowledge store 40.

The delivery module 10 cooperates with the persistence knowledge store 40 and/or neural networks model 30. When the delivery model module detects that a second user (e.g., the consumer) is working on at least one of 1) a task/activity similar to the first user, 2) a subject matter similar to the subject matter of the embedding and/or 3) a similar role to the first user, as well as passes a threshold setting of relevance, then the delivery module 10 will try to determine all three of the task being performed by the second user, the second user's hierarchy/role in the organization, and the subject matter involved in the task/activity being performed by the second user. Once this happens, then the delivery module 10 will try to proactively route a notice on the relevant embedding to the second user (e.g., consumer).

Figure 4:
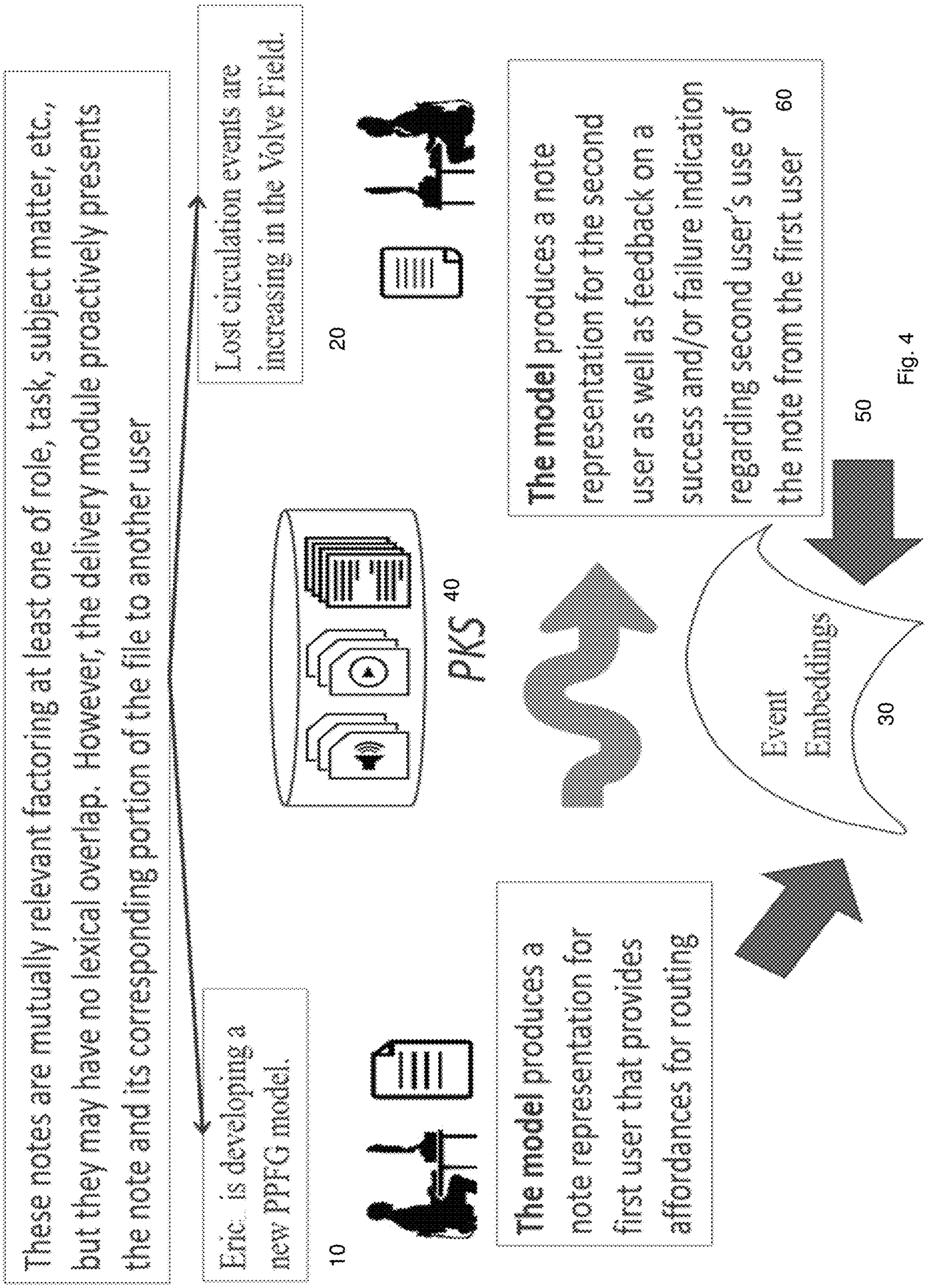
FIG. 4 illustrates a block diagram of an embodiment of the delivery module, the collection module, the persistence knowledge store, and the neural networks model working together in a little more detail than in FIG. 3.

FIG. 4 illustrates a block diagram of an embodiment of the delivery module 10, the collection module 20, the persistence knowledge store 40, and the neural networks model 30 working together in a little more detail than in FIG. 3. Both the collections module and the delivery module 10 determine whether these notes/annotations are relevant by a threshold amount between the stored embedding and at least one of 1) a task/activity similar to the first user, 2) a subject matter of the second user's task/activity similar to the subject matter of the embedding and/or 3) a similar role to the first user, but they may have no lexical overlap. The more of these factors 1) the task/activity similarity between the first user and the second user, 2) the subject matter similarity between the embedding and the subject matter involved in the task/activity performed by the second user, and/or 3) a similarity of the role including factoring department within the company between the first user and the second user, then a higher relevancy exists between the embedding and the activity/subject matter/role of the second user (e.g. consumer). The user can set the relevancy threshold level. However, once the delivery module 10 determines that they are potentially relevant (e.g., equal to or above the threshold amount), then the delivery module 10 proactively presents a notice regarding the annotation and its corresponding portion of the file to another user. For example, again in this example, Eric as the first user and an engineer is developing a new PPFG model including the geophysics and she produced a note representation regarding this file, and the persistence knowledge store 40 stores the corresponding embedding.

The second user whose role is a drill planner is working on the subject matter of lost circulation events that are increasing in the geophysics of the Volve field, which subject matter wise is related to the geophysics in the new PPG model and the second user is a drill planner which is the same level of hierarchy in the organization as Eric as an engineer. The delivery module 10 produces the notice on the embedding and presents that notice to the second user, and then the feedback module 50 can utilize whether there was a 'success' indication or a 'failure' indication regarding whether the second user used the presented note about the embedding. The evaluation module 60 and the feedback module 50 utilize that positive or negative indication back to the persistence knowledge store 40 and/or the neural networks model 30 to adjust the linear distance of where the embedding presented in the notice is stored in the common shared embedding space relative to other embeddings that should have been similar to that embedding based on the relevancy determination and/or back to the neural networks module to refine the training on and understanding of that particular embedding.

A key insight in generalized knowledge routing is that user actions can be viewed as something more than just note-taking, but information/knowledge that can be routed to others, and then learning the correspondence between captured knowledge and elements of the performance space. While users attach annotations to particular passages (e.g., Documents), it cannot be presumed that the scope of the knowledge they provide is limited to just the annotated passage or document. In the example above, an existing system may want the knowledge that Eric or the geophysics of the PPFG model are good starting points for diverter lines or shallow gas issues to be accessible via any relevant documents. The annotation enables administrators to stipulate in simple English some local structures relevant to task performance (e.g., "Eric Ensey and John Worthington are members of the Drilling Ops group.").

A system like that, however accurate and elaborate, is likely to be insufficient because it is difficult to anticipate all relevant factors in a given situation. Instead, the current system and method will acquire knowledge of such factors through usage. The key insight is that user actions can be viewed as something more than just note-taking, as examples of something that can be called knowledge routing. When a person annotated that Eric should be contacted for diverter lines, what the person is really saying is that Eric and her department are enablers for a space of concerns in which diverter lines and shallow gas are key concepts. But what is the extent of this particular space of concern? Generalized knowledge routing provides a set of candidate nuggets given user context and corresponding organizational usage patterns. The system and method will also provide a practical answer to such questions through predictive modeling.

Figure 5:
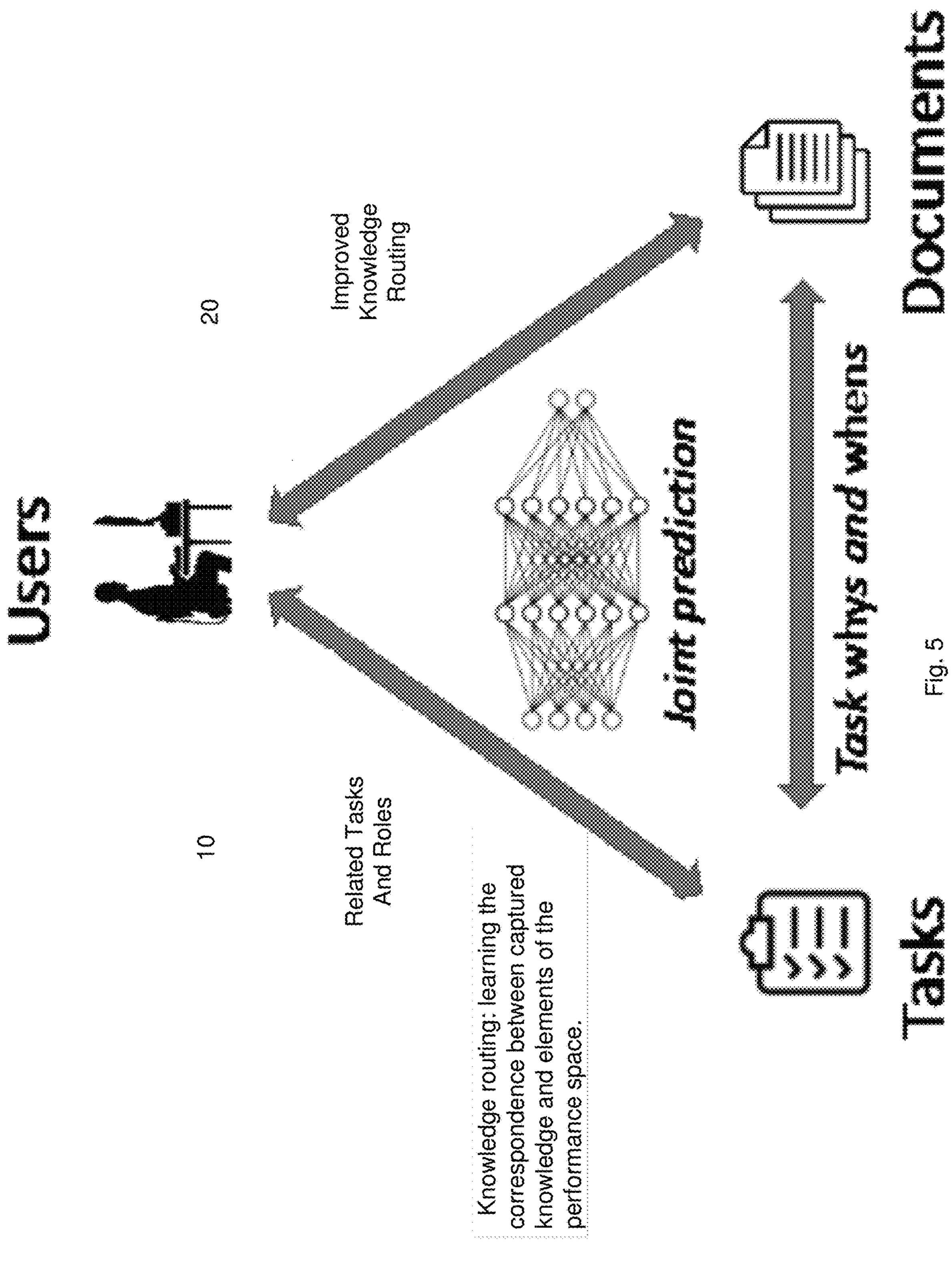
FIG. 5 illustrates a block diagram of an embodiment of the collection module and/or delivery module looking at factors of relevancy such as the relationships between the user and their role, the task and/or activity that the user was engaging in when they were looking at this file and made the annotation, as well as the subject matter of the file.

FIG. 5 illustrates a block diagram of an embodiment of the collection module 20 and/or delivery module 10 looking at factors of relevancy such as the relationships between the user and their role, the task and/or activity that the user was engaging in when they were looking at this file and made the annotation, as well as the subject matter of the file (e.g., document, text, video, etc.). All of this is being done so that the knowledge routing and prediction of what other users may utilize the information associated with the embedding, which is stored in a shared performance space.

The delivery module 10 understands what the first user is currently doing and the relevancy of embeddings stored in the shared embeddings space. The delivery module 10 matches/measures the relatedness of the embeddings of this mixed factors information. Delivery optimization is designed primarily to support proactive (push) delivery of information to users. The system could use assistance patterns that would suggest tasks to users whenever a trigger was activated. In addition, the system supports automated proactivity, via generalized knowledge routing, as it recommends content that other users typically interact with in similar task contexts. Delivery optimization further filters this candidate set based on its model of an individual user's expertise about different concepts and the situation in which the information is to be delivered. This additional contextualization is not only useful for achieving just enough content delivery but is also essential when a system is first deployed or changes occur to the organizational knowledge or its use, and the models used by generalized knowledge routing can be trained to provide good recommendations.

As shown in FIG. 5, any instance of knowledge capture via the annotation involves a juxtaposition of elements from multiple domains in performance space, which the figure displays in simplified form. Each such action establishes a link at multiple levels: between the annotation and the document or passage; between the user (with her organizational role) and a document or passage; between the user and the role she occupies and task (including the stage of execution or completion status); between the task (completion status) and the passage/portion of the file/document being annotated; etc. In the system and method described herein, these action-driven linkages serve as positive examples of training data to, for example, a Deep neural network (DNN) model attempting to predict them in the service of generalized knowledge routing. In an embodiment, the system and method approach this prediction problem using graph neural networks, with learned multi-modal embeddings for all elements of the performance space sketched in FIG. 5.

This approach also naturally captures phenomena such as expertise and authority. If the nuggets captured in an annotation from a particular user find broad acceptance among other users in a particular task area, success in predicting this uptake will be optimized by assigning a distinctive embedding to the authoritative user and associating it with task embeddings that group-related tasks.

In the context of knowledge routing, annotations that are incorrectly interpreted amount to noisy training data. To flag candidate errors of this type, the system and method will systematically inspect new annotations to compare the attachments made by users, with those predicted by the system, flagging apparently anomalous annotations for review.

A new event happens in this production space and that new event gets mapped to some point in this space.

In an example, a user in the role of an engineer researching the subject matter of geophysics. The delivery module 10 can then look at the role of the end user, the subject matter being analyzed by the end user, etc. The delivery module 10 then drops some knowledge into the computing device of the end user and asks, "Would it be of interest to you?" The delivery module 10 presents possibly useful things to them, and if the end user consumes (e.g., clicks through) one of the notices presented to the end user, then the evaluation module 60 notes the positive reinforcement, which is fed to the feedback module 50. The particular feedback nugget now has expanded information about the particular nugget.

The system now maintains an association between this note-to-self in the annotation and the target passage/portion of a file making it available for the first user or another user the next time this user or another user is in a similar situation. Through a process of interpretation, expansion, and indexing, the system increases the odds that this user's annotation will be useful to others and apply to related but not identical tasks. this user's annotation can be converted to a set of tuples and then expanded through a lightweight inference process. Abstraction of the tuples can occur, including argument ablation, argument subsumption (using general or local knowledge resources, such as a corporate directory), or metonymic chaining (e.g., replacing Joan with the department she works for). Finally, the tuples are used to index the annotated passage, and a connection is made for this user and all his colleagues between the note to self-made on that portion of the document/file on diverter lines and contacting Eric or someone in Well Programming Services.

Another user, such as Joe, may use the annotations made by Eric. Joe is charged with the task of orchestrating the drilling of a new well and reviewing relevant company documentation. Joe is interested in expediting the mitigation of "shallow gas," a hazardous condition that can cost lives and equipment, using subsea diverter lines. Eric recorded a piece of hard-earned wisdom by highlighting a relevant piece of documentation and typing (guidance or speaking or recording a short video) (e.g., a note to self regarding this target passage of this document) she has found useful in this and similar contexts: Contact Joan Smith, WPS. The system and method now maintain an association between this note-to-self and the target passage making it available for Eric or Joe the next time he or she is in a similar situation.

Figure 6:
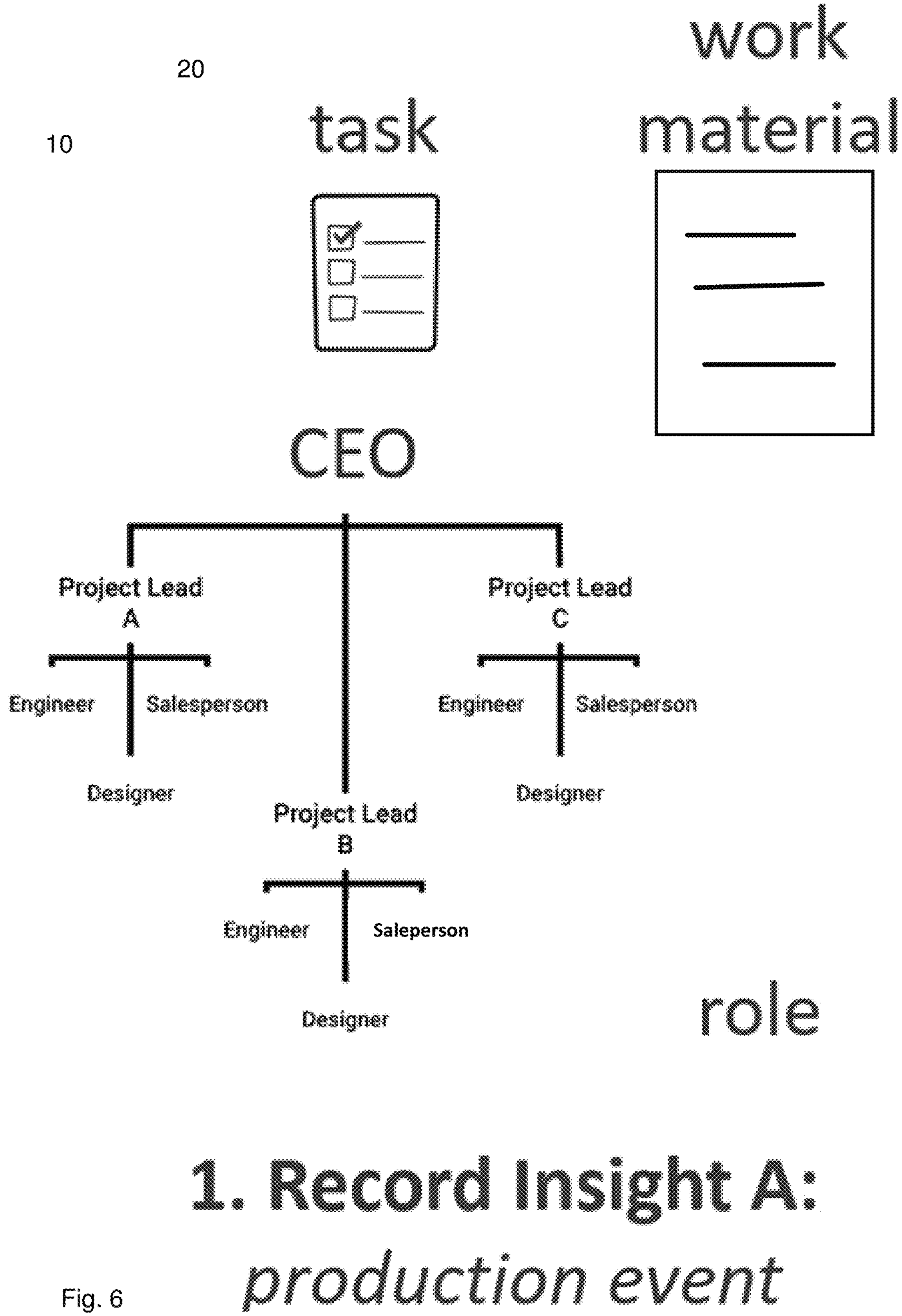
FIG. 6 illustrates a block diagram of an embodiment of the collection module and/or delivery module collecting metadata, such as the task, the role of the user in the organization, the type of subject matter being worked on, and the subject matter of the work material/file under analysis.

FIG. 6 illustrates a block diagram of an embodiment of the collection module 20 and/or delivery module 10 collecting metadata, such as the task, the role of the user in the organization, the type of subject matter being worked on, and the subject matter of the work material/file under analysis. The user's role can be CEO, project lead, engineer, salesperson, designer, etc., and what department the person is in.

The collection module 20 when presenting an annotation template to each user, then the collection module 20 can collect metadata information such as the user's name, e.g., John Smith, his role in the organization, etc. The content of the annotation can all be indexed and stored and then semantically interpreted and abstracted by the machine learning into an embedding, which is stored with other embeddings. The collection module 20 and/or delivery module 10 can collect that metadata along with parsing the relevant information via sensors such as OCR, image recognition, and other mechanisms to record and create that annotation and the portion of the file that will be fed to the neural networks model(s) 30 so that they can then make an embedding's understanding of that record.

On the delivery side, the delivery module 10, when monitoring the second user, also semantically parses and indexes the elements of the file that the other user is using/creating as well as the second user's role in the organization and activity/task the second user is engaged in.

FIG. 7 illustrates a block diagram of an embodiment of synthetic data used to generate synthetic versions of the annotations, which can be used to train each of the neural networks model 30 utilized by this system. The neural networks model 30 can use synthetic data coming from a generative large language model to generate synthetic versions of the annotations with the synthetic data in an initial training process of the neural networks model 30. The generated synthetic versions of the annotations can include example information.

For example, the task details and updates on assisted rig inspection. The assisted rig inspection includes the collaboration with the inspection team during the assessment of Rig #3. Helped identify and address minor issues in the drilling mud circulation system. The rig passed inspection for operational readiness.

Next, challenges and things learned.

1. Equipment calibration learning the intricacies of the equipment calibration procedures. Gaining hands-on experience with the equipment calibration. Upcoming focus areas. 2. Data analysis—work closely with the analysis team to delve deeper into the pressure data from Well A #17. Collaborate on identifying potential reservoir pressure decline causes and brainstorm mitigation strategies. The second user may be involved in the task of doing rig inspection and looking at the equipment calibration these notes are actively pushed to that user on their computing device. The neural networks model 30 can use synthetic data using generative LLMs to bootstrap the process to solve the kind of chicken and egg problem it faces to initially train the machine learning in the neural networks model 30. Thus, the system may use that synthetic data for the initial training process of each of the neural networks model 30 being used.

In one embodiment, the system and method may be agnostic to the particular domain by design. As a result, one advantage is that it can fundamentally improve how large, complex organizations, in government or industry, capture and manage important operational knowledge. The payoff will be a seamless increase in efficiency in the execution of business processes.

In one embodiment, a key feature may be the proactive routing of information.

Most previous content solutions are primarily passive.

Through task-informed interaction management, knowledge overlaps can be identified by aligning queries issued to the persistent knowledge store (PKS), user feedback on content to identify content, measuring the distance to embeddings stored in the PKS (as a measure of the loss function), extended user use, etc.

In addition, the generalized knowledge routing provides a set of candidate nuggets of the machine learning's embedding understanding of each annotation—given user context and corresponding organizational usage patterns. In delivery optimization, the system selects from among these candidates the items that maximize knowledge gain while minimizing dissemination cost, given the user's knowledge and situational context.

By making it possible to share experiences and insights in a timely and context-aware manner, the system will enable users to create organizational knowledge that can be proactively disseminated to serve communities of practice (CoPs) as needed. This efficiency of capture and delivery will eliminate time-consuming searches to fill knowledge gaps, improving the effectiveness of experienced users and decreasing time to competency for new. The system capabilities can be active rather than passive, task-aware, user role aware, and/or subject matter aware, rather than context-free, and personalized to align with individual expertise and preferences. Through delivery optimization, the system provides users with content tailored to their knowledge needs (just enough), at the right level (just for me), both on-demand and proactively (just in time, initiated by the system itself, etc.). Moreover, the proactive delivery puts the burden on initiating the user interactions in the collaborative process on the delivery module cooperating with the persistence knowledge store. The system can eliminate much of the human effort required today to find and extract knowledge from files under analysis such as document files, video files, audio files, etc.

Computing Systems

Figure 8:
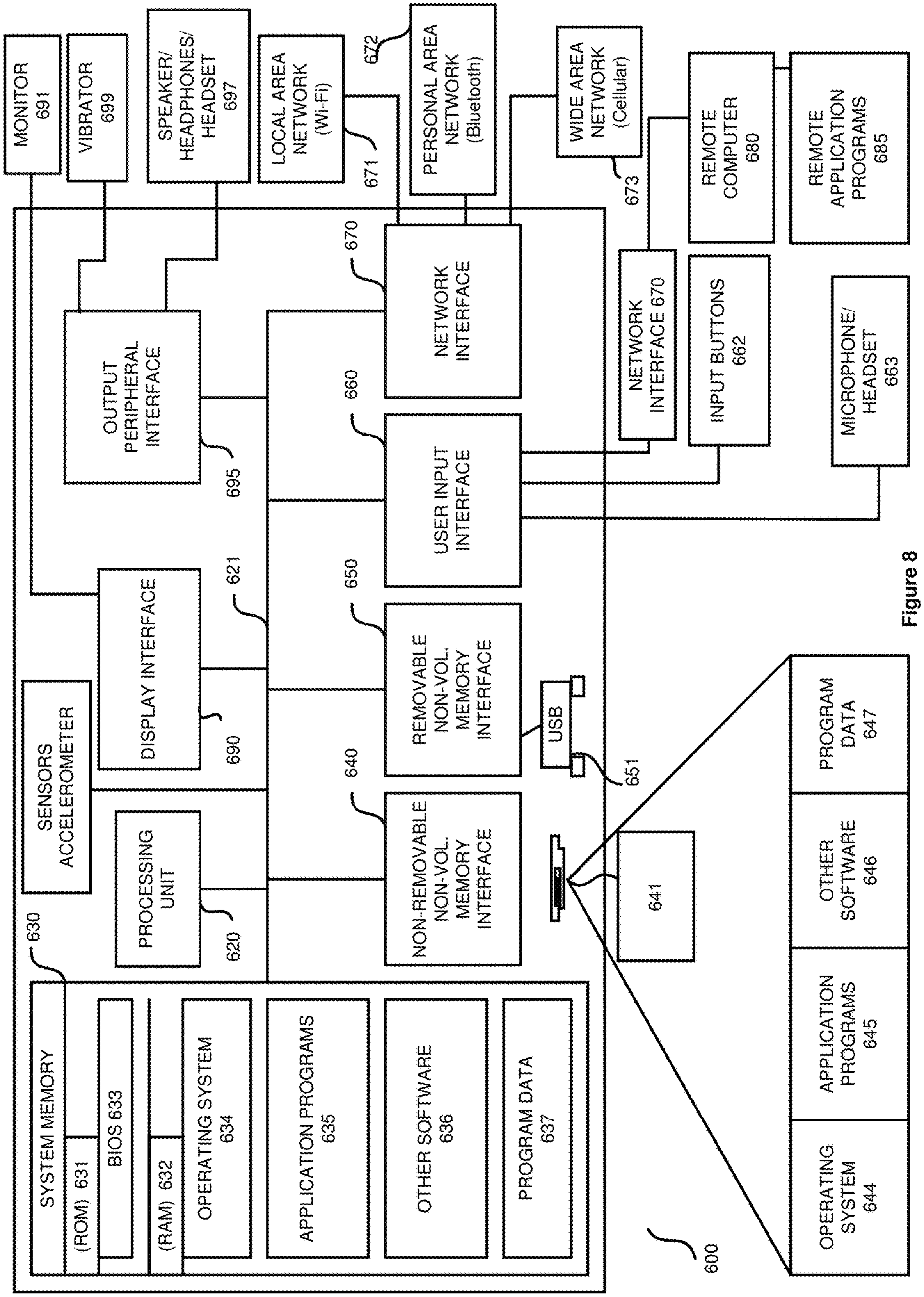
FIG. 8 illustrates a diagram of an embodiment of a computing device that can be a part of the system, device, and method to provide generalized knowledge routing utilizing machine learning to a user within the system discussed herein.

FIG. 8 illustrates a diagram of an embodiment of a computing device that can be a part of the system, device, and method to provide generalized knowledge routing utilizing machine learning to a user within the system discussed herein. The computing device 600 may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this system that are implemented in software 644, 645, 646 may be stored in the one or more memories 630-632 and are executed by the one or more processors 620.

As discussed, portions of the delivery module 10, the collection module 20, the neural networks model 30, the persistence knowledge store 40, the feedback module 50, the evaluation module 60, and other associated modules can be implemented with aspects of the computing device.

The system memory 630 includes computer storage media in the form of volatile and/or nonvolatile memory such as read-only memory (ROM) 631 and random access memory (RAM) 632. These computing machine-readable media can be any available media that can be accessed by computing system 600. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. Transitory media such as wireless channels are not included in the machine-readable media. Communication media typically embody computer readable instructions, data structures, other executable software, or other transport mechanism and includes any information delivery media.

The system further includes a basic input/output system 633 (BIOS) containing the basic routines that help to transfer information between elements within the computing system 600, such as during start-up, is typically stored in ROM 631. RAM 632 typically contains data and/or software that are immediately accessible to and/or presently being operated on by the processing unit 620. By way of example, and not limitation, the RAM 632 can include a portion of the operating system 634, application programs 635, other executable software 636, and program data 637.

The computing system 600 can also include other removable/non-removable volatile/nonvolatile computer storage media. By way of example only, the system has a solid-state memory 641. The solid-state memory 641 is typically connected to the system bus 621 through a non-removable memory interface such as interface 640, and USB drive 651 is typically connected to the system bus 621 by a removable memory interface, such as interface 650.

A user may enter commands and information into the computing system 600 through input devices such as a keyboard, touchscreen, or software or hardware input buttons 662, a microphone 663, a pointing device and/or scrolling input component, such as a mouse, trackball or touch pad. These and other input devices are often connected to the processing unit 620 through a user input interface 660 that is coupled to the system bus 621, but can be connected by other interface and bus structures, such as a parallel port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibrator 699, and other output devices, which may be connected through an output peripheral interface 695.

The computing system 600 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing system 600. The logical connections can include a personal area network (PAN) 672 (e.g., Bluetooth®), a local area network (LAN) 671 (e.g., Wi-Fi), and a wide area network (WAN) 673 (e.g., cellular network), but may also include other networks such as a personal area network (e.g., Bluetooth®). Such networking environments are commonplace in offices, enterprise-wide computer networks, intranets, and the Internet. A browser application may be resonant on the computing device and stored in the memory.

When used in a LAN networking environment, the computing system 600 is connected to the LAN 671 through a network interface 670, which can be, for example, a Bluetooth® or Wi-Fi adapter. When used in a WAN networking environment (e.g., Internet), the computing system 600 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing system 600, or portions thereof, may be stored in the remote memory storage device. By way of example, and not limitation, the system has remote application programs 685 as residing on remote computing device 680. It will be appreciated that the network connections shown are examples and other means of establishing a communications link between the computing devices that may be used.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMS, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, Python, or other similar languages. Also, an algorithm can be implemented with lines of code in software, configured logic gates in software, or a combination of both. Any portions of an algorithm implemented in software can be stored in an executable format in portion of a memory and is executed by one or more processors. In an embodiment, a module can be implemented with electronic circuits, software being stored in a memory and executed by one or more processors, and any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

References in the specification to "an embodiment," "an example," etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:

a delivery module that is configured to cooperate with a neural networks model, and a persistence knowledge store, where machine learning in the neural networks module is configured to analyze an annotation and its metadata on the annotation made by a first user on a first computing device to make an embedding regarding the annotation and then cooperate with the persistence knowledge store to store the embedding of the machine learning's understanding of the annotation and its metadata, and where the delivery module is further configured to facilitate a collaborative process between users of a system by sending a push notice regarding a potentially related embedding to a second user on a second computing device based on a threshold amount of relatedness between one or more factors selected from a group consisting of i) a first task undertaken by the first user and a second task undertaken by the second user, ii) a role of the first user and a role of the second user, and iii) a subject matter of the embedding to a subject matter of a task undertaken by the second user, where portions of the delivery module, the neural networks model, and the persistence knowledge store implemented in software instructions are stored in an executable format in one or more memories to be executed by one or more processing units.

2. The apparatus of claim 1, further comprising:

a collections module is configured to use one or more sensors to capture and understand content in the annotation and portions of a file corresponding to the annotation, and then after a semantic analysis and parsing of the content in the portion of the file and its corresponding annotation, then the collections module is configured to supply the portion of the file and its corresponding annotation for the analysis using the machine learning in the neural networks model to create the embedding.

3. The apparatus of claim 1, where the delivery module is configured to cooperate with at least one of the persistence knowledge store and the neural networks model to monitor activities of the second user in order to trigger a proactive push of the notice regarding the potentially related embedding.

4. The apparatus of claim 1, where the neural networks model is configured to use synthetic data coming from a generative large language model to generate synthetic versions of the annotations with the synthetic data in an initial training process of the neural networks model.

5. The apparatus of claim 1, where the delivery module is further configured to cooperate with at least one of the persistence knowledge store and the neural networks model, where the delivery module is configured to make queries back and forth with at least one of the neural networks module and the persistence knowledge store in order to retrieve information regarding the embedding on the annotation its meta data and a portion of a file corresponding to the annotation, when making a determination to proactively push the notice regarding the potentially related embedding out to the second user on the second computing device.

6. The apparatus of claim 1, further comprising:

an evaluation module configured to track whether the second user consumed the proactively delivered notice.

7. The apparatus of claim 6, where the evaluation module is configured to cooperate with a feedback module such that the consumption event of the proactively delivered notice is then supplied by the feedback module to at least one of i) the persistence knowledge store to adjust a distance between stored embeddings in a common shared embedding space relative to other embeddings based upon whether the proactively delivered notice was consumed by the second user or not, and ii) to the neural networks model to refine the machine learning's understanding of the embedding with additional information about the embedding based upon whether the proactively delivered notice was consumed by the second user or not and then store the refined machine learning's understanding of the embedding in the common shared embedding space relative to other embeddings in the persistence knowledge store.

8. The apparatus of claim 1, where the collection module and the neural networks model are configured to cooperate with the persistence knowledge store to create a shared embedding space for the embedding relative to other embeddings, as well as the persistence knowledge store has a search function for all of the embeddings stored in that persistence knowledge store, where a corpus of all of the embeddings were produced by the neural networks model.

9. The apparatus of claim 1, where the delivery module is further configured to proactively push the notice regarding the potentially related embedding out to the second user on the second computing device based on the threshold amount of relatedness between all three factors selected from the group consisting of i) the first task undertaken by the first user and the second task undertaken by the second user, ii) the role of the first user and the role of the second user, and iii) the subject matter of the embedding to the subject matter of task undertaken by the second user.

10. The apparatus of claim 1, where the neural networks model is composed of at least one or more graph neural networks.

11. A method to provide generalized knowledge routing utilizing machine learning to users within a system, comprising:

providing a delivery module that cooperates with a neural networks model, and a persistence knowledge store, providing machine learning in the neural networks module to analyze an annotation and its metadata on the annotation made by a first user on a first computing device to make an embedding regarding the annotation and then cooperate with the persistence knowledge store to store the embedding of the machine learning's understanding of the annotation and its metadata, and providing the delivery module to proactively push a notice regarding a potentially related embedding to a second user on a second computing device based on a threshold amount of relatedness between one or more factors selected from a group consisting of i) a first task undertaken by the first user and a second task undertaken by the second user, ii) a role of the first user and a role of the second user, and iii) a subject matter of the embedding to a subject matter of a task undertaken by the second user, where portions of the delivery module, the neural networks model, and the persistence knowledge store implemented in software instructions are stored in an executable format in one or more memories to be executed by one or more processing units.

12. The method of claim 11, further comprising:

providing a collections module to use one or more sensors to capture and understand content in the annotation and portions of a file corresponding to the annotation, and then after a semantic analysis and parsing of the content in the portion of the file and its corresponding annotation, then the collections module to supply the portion of the file and its corresponding annotation for the analysis using the machine learning in the neural networks model to create the embedding.

13. The method of claim 11, further comprising:

providing the delivery module to cooperate with at least one of the persistence knowledge store and the neural networks model to monitor activities of the second user in order to proactively push the notice regarding the potentially related embedding.

14. The method of claim 11, further comprising:

providing the neural networks model to use synthetic data coming from a generative large language model to generate synthetic versions of the annotations with the synthetic data in an initial training process of the neural networks model.

15. The method of claim 11, further comprising:

providing the delivery module to cooperate with at least one of the persistence knowledge store and the neural networks model, where the delivery module is configured to make queries back and forth with at least one of the neural networks module and the persistence knowledge store in order to retrieve information regarding the embedding on the annotation its meta data and a portion of a file corresponding to the annotation, when making a determination to proactively push the notice regarding the potentially related embedding out to the second user on the second computing device.

16. The method of claim 11, further comprising:

providing an evaluation module to track whether the second user finds the proactively delivered notice on the annotation useful by determining whether the second user consumed the proactively delivered notice.

17. The method of claim 16, further comprising:

providing the evaluation module to cooperate with a feedback module such that the consumption event of the proactively delivered notice is then supplied by the feedback module to at least one of i) the persistence knowledge store to adjust a distance between stored embeddings in a common shared embedding space relative to other embeddings based upon whether the proactively delivered notice was consumed by the second user or not, and ii) to the neural networks model to refine the machine learning's understanding of the embedding with additional information about the embedding based upon whether the proactively delivered notice was consumed by the second user or not and then store the refined machine learning's understanding of the embedding in the common shared embedding space relative to other embeddings in the persistence knowledge store.

18. The method of claim 11, further comprising:

providing the delivery module and the neural networks model to cooperate with the persistence knowledge store to create a shared embedding space for the embedding relative to other embeddings, as well as the persistence knowledge store has a search function for all of the embeddings stored in that persistence knowledge store, where a corpus of all of the embeddings were produced by the neural networks model.

19. The method of claim 11, further comprising:

providing the delivery module to proactively push the notice regarding the potentially related embedding out to the second user on the second computing device based on the threshold amount of relatedness between all three factors selected from the group consisting of i) the first task undertaken by the first user and the second task undertaken by the second user, ii) the role of the first user and the role of the second user, and iii) the subject matter of the embedding to the subject matter of task undertaken by the second user.

20. A non-transitory machine-readable medium, which stores further instructions in an executable format by one or more processors to cause operations as follows, comprising:

using a delivery module that cooperates with a neural networks model, and a persistence knowledge store, using machine learning in the neural networks module to analyze an annotation and its metadata on the annotation made by a first user on a first computing device to make an embedding regarding the annotation and then cooperate with the persistence knowledge store to store the embedding of the machine learning's understanding of the annotation and its metadata, and using the delivery module to proactively push a notice regarding a potentially related embedding out to a second user on a second computing device based on a threshold amount of relatedness between one or more factors selected from a group consisting of i) a first task undertaken by the first user and a second task undertaken by the second user, ii) a role of the first user and a role of the second user, and iii) a subject matter of the embedding to a subject matter of a task undertaken by the second user, where portions of the delivery module, the neural networks model, and the persistence knowledge store implemented in software instructions are stored in an executable format in one or more memories to be executed by one or more processing units.

* * * * *